United States Patent [19]

Haley

[11] 4,313,784

[45] Feb. 2, 1982

[54] CLIMBING FILM HEAT EXCHANGE APPARATUS

[75] Inventor: Floyd C. Haley, Glendora, Calif.

[73] Assignee: International Refining Equipment, Walnut Creek, Calif.

[21] Appl. No.: 807,734

[22] Filed: Jun. 17, 1977

[51] Int. Cl.³ .............................................. B01D 5/22
[52] U.S. Cl. .................................... 159/6 W; 159/14
[58] Field of Search ............ 159/6 W, 14, 16 R, 16 A

[56] References Cited

U.S. PATENT DOCUMENTS

| | | | |
|---|---|---|---|
| 1,410,492 | 3/1922 | Merrell | 159/6 W |
| 2,866,499 | 12/1958 | Haley | 159/6 W |
| 3,252,502 | 5/1966 | Eckardt et al. | 159/6 W |
| 3,265,115 | 8/1966 | Maier | 159/6 W |
| 3,488,686 | 1/1970 | Dunwoody et al. | 159/16 A |

Primary Examiner—Norman Yudkoff
Attorney, Agent, or Firm—Robert G. Slick

[57] ABSTRACT

A climbing film heat exchange apparatus and particularly an evaporator is provided wherein a turbine is mounted on the shaft of the evaporator so that it is not necessary to provide a fluid seal on the shaft and, in some embodiments, the heat employed to drive the turbine also serves as part or all of the heat supplied to the apparatus for the heat treatment. In some embodiments of the invention wherein a hydrocarbon fluid is employed and it is desired to recover water, the water of combustion is recovered as part of the desired product.

5 Claims, 4 Drawing Figures

CLIMBING FILM HEAT EXCHANGE APPARATUS

SUMMARY OF THE INVENTION

The present invention relates to a climbing film apparatus and is an improvement on my prior patent, namely, U.S. Pat. No. 2,866,499.

Climbing film heat exchange apparatus is known from the above noted prior patent and others and, in general, such equipment is employed for processes wherein a portion or all of the liquid is evaporated although the devices are of general utility and can be used in any application for the heat exchange treatment of fluid and particularly fluids which are difficult to handle in conventional heat treating apparatus such as viscuous fluids and suspensions.

The climbing film apparatus heretofore known require that a center rotor be driven by means of an external motor and it is necessary to provide efficient fluid seals on the shaft. Further, the main application of such climbing film devices is to serve as an evaporator in which case it is necessary to supply a substantial amount of heat to the apparatus. This is ordinarily done by means of heat exchange jacket wherein heat is supplied to the jacket to serve to evaporate a fluid climbing on the inside of the rotor housing. It is frequently difficult to supply a sufficient amount of heat to accomplish the desired purpose.

In accordance with the present invention, an improved form of climbing film apparatus is provided wherein a turbine is mounted directly on the shaft of the rotor and a fluid, ordinarily a hot gas or vapor, is passed through the apparatus to drive the turbine. Since the drive is developed on the inside of the apparatus, it is not necessary to provide fluid seals on the shaft, greatly simplifying the equipment.

A further advantage of the present invention is that the gas which drives the turbine is ordinarily hot so that in some embodiments of the invention the heat from the driving fluid also serves to heat the material being treated so that it supplies all or at least a part of the heat necessary for the treatment. Thus, the necessity of supplying heat from an external source to a heat exchange jacket is greatly reduced and, in many instances, all of the heat can be supplied by the driving fluid.

In accordance with another embodiment of the invention, heat supplied through the jacket vaporizes a portion of the fluid being treated and this vapor drives the turbine.

The device of the present invention is more efficient than existing units and accomplishes the same throughout as plants many times its size. It is completely practical to build the units in a large range of sizes from small household units to large industrial units.

Since the unit can be made in small sizes, it is completely practical to make units wherein one or more of the units could function in the household for purifying water for reuse as well as supplying hot water. In one contemplated use, the waste water from a household could be segregated into two or more categories with a separate unit serving to purify each of the individual water sources for reuse.

In industrial plants, the device can be made in modular form so that many small units could be hooked together, obviating the need for running at or near full capacity. In other words, if only a small capacity were called for, a few of the units could be operated while at maximum capacity called for, all of the units could be put on stream.

An energy source is suitable for use with the present invention. For example, waste steam from nuclear energy electrical generation or hydrocarbon fuel.

The device of the present invention can be used with a variety of feed stocks and it is not required that the feed stock be pretreated. The device of the present invention is particularly suited for the desalination of water wherein most of the water from a brine can be extracted, leaving an extremely concentrated brine which is suitable for use in the chemical industries. Since the range of feed materials is so great, there are substantial advantages of using the present invention for desalination over other well-known techniques such as ordinary vacuum distillation or reverse osmosis. In this connection, the unit makes an excellent source of fresh water for ships or for isolated communities.

In some embodiments of the invention, the unit can be operated at low temperatures so that heat sensitive materials such as milk can be pasteurized without scorching or other materials such as natural waters can be treated without destroying plankton or other organic life in the water.

The device of the present invention can be used for the separation of harmful chemical solids from various liquids and is excellent in the clarification of sewage water for industrial use.

In many instances, the unit is used for the desalination of water so that the desired product is the water itself. In such cases, one can utilize a hydrocarbon fuel for running the unit and supplying heat thereto and the water produced by the combustion of the hydrocarbon fuel will be recovered as part of the water which is desired as product.

The device of the present invention can be used with superheated water in which case the water would be flashed off and the device of the present invention allows accurate control so that the device is much more efficient than conventional flash evaporators.

In many instances, valuable inorganic materials can be recovered from the unit such as the chlorides, sulfates and carbonates of various metals.

Only a few typical applications have been mentioned and the device is one of broad application.

Various other objects and features of the invention will be brought out in the balance of the specification.

DESCRIPTION OF THE PREFERRED EMBODIMENTS

Figures 1, 2:
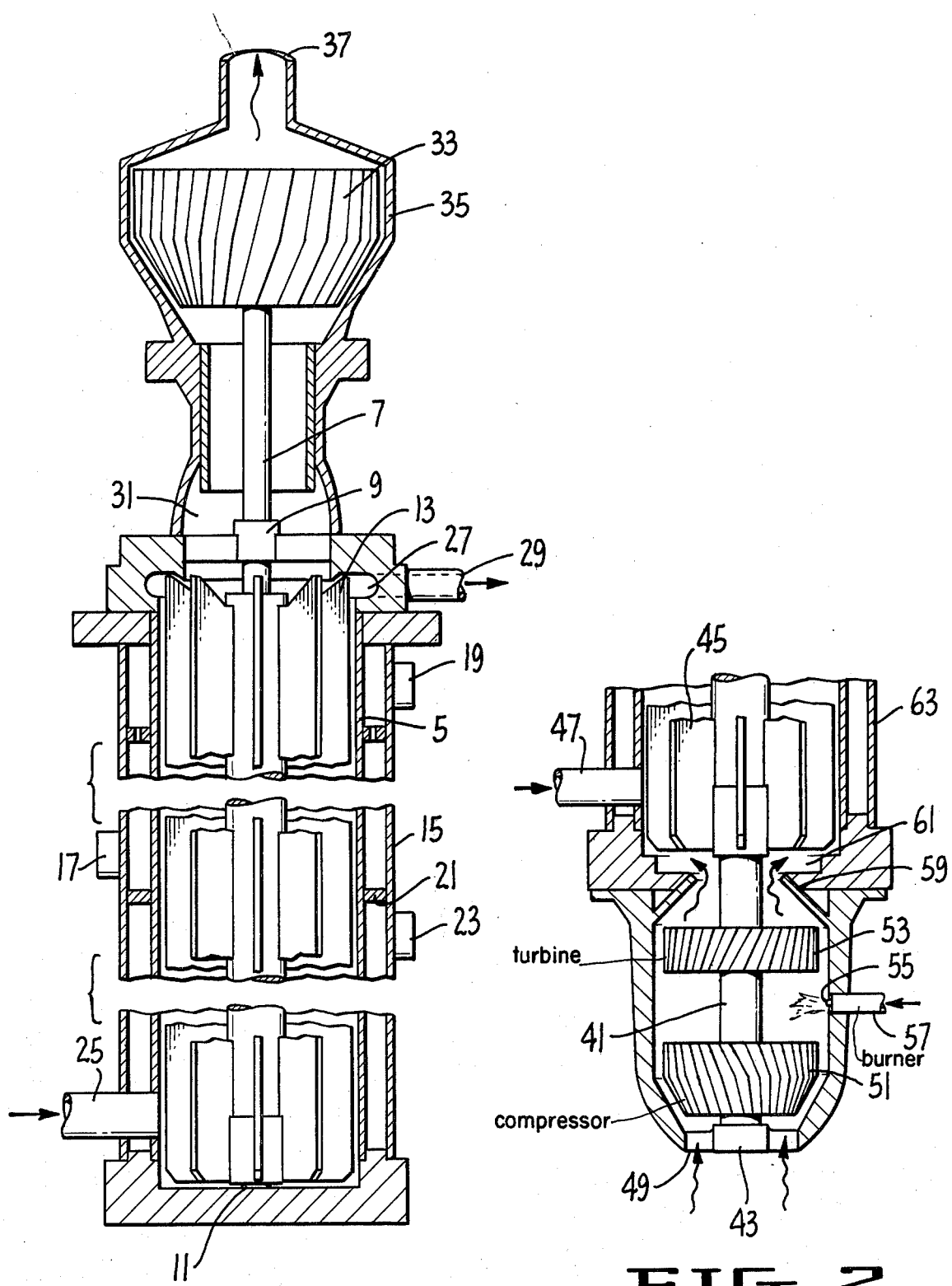
FIG. 1 is a side view of a climbing film apparatus having a turbine at the top for driving the shaft of the rotor from vapor developed within the apparatus.
FIG. 2 is a partial sectional view of a climbing film apparatus wherein an axial compressor and turbine are provided on the rotor shaft with means for directly supplying heat in the form of a flame between the compressor and the turbine.

Referring now to FIG. 1, the evaporator includes a cylindrical shell 5 having a shaft 7 mounted for rotation at the center thereof on the upper bearing 9 and a lower bearing 11. Mounted on shaft 7 are imperforate rotor blades 13 which have a very small clearance with the shell 5. A heat exchange jacket 15 is provided outside of shell 5 with an inlet 17 and an outlet 19 for the heat exchange fluid. In the embodiment shown, the jacket is divided into two portions by means of partition 21 although a single chamber or more than two chambers may be employed in the heat exchange jacket. If more than one chamber is employed, obviously additional inlets and outlets will be required for the heat exchange fluid such as the one shown at 23. Heat is supplied to the jacket in the form of a heated fluid, ordinarily a heated high boiling liquid.

Near the bottom of the chamber formed by the shell 5 is an inlet 25 for the liquid to be treated and near the top of the chamber is an annular space 27 for the collection of the treated liquid, the annular space leading to a discharge pipe 29. Vapor which arises from the treatment will be discharged upwardly through the port 31. It will be recognized that the parts heretofore described are largely in common with U.S. Pat. No. 2,866,499 so that various construction details have been omitted.

In accordance with the present invention, shaft 7 also carries turbine blades 33 which are disposed in an enlarged chamber 35 formed on top of the discharge port 31. Thus, vapor passing upwardly through the chamber 31 impinges on the turbine blades 33 rotating the shaft 7. Effluent vapor is taken off through the outlet port 37.

In this embodiment of the invention, the vapor generated by the action of the heat in the jacket 15 serves not only to provide the necessary heat for the evaporation of a portion of the liquid which enters through the inlet 25 but also the vapor thus driven off serves to drive the turbine 33 and shaft 7 so that it is not necessary to provide a separate power source for driving shaft 7, greatly simplifying the equipment, particularly in the elimination of a vapor proof seal at the bottom of the shaft.

In many instances, hot combustion gas which is used to drive the turbine can be brought into direct contact with the liquid to be treated without contaminating the liquid. This is particularly advantageous since direct contact between the liquid to be treated and the hot combustion gas provides a very efficient heat transfer. Suitable equipment for accomplishing this is shown in FIGS. 2 and 3.

Referring now particularly to FIG. 2, shaft 41 is mounted for rotation in lower bearing 43, the shaft 41 carrying the usual blades 45 and being mounted in a cylindrical shell as heretofore described. An inlet 47 is provided for the liquid to be treated. The bottom of the apparatus is provided with air inlets 49 and shaft 41 carries an axial compressor 51 and, spaced therefrom, are turbine blades 53. A burner 55 is provided between the compressor and the turbine and is supplied with a suitable fuel, such as gas or oil, from line 57. The operation is as previously described except in this case the hot combustion gas drives turbine 53 and after leaving the turbine, passes around baffles 59 and then passes through chamber 61 where it comes in direct contact with the liquid being treated. A heat exchanger shell 63 may or may not be necessary depending on whether liquid being treated requires more heat than is supplied by the burner 55 and, in some instances, the heat exchanger shell 63 can be used for a cooling fluid in case less heat is required for the evaporation than is required to drive the turbine.

Figure 3:
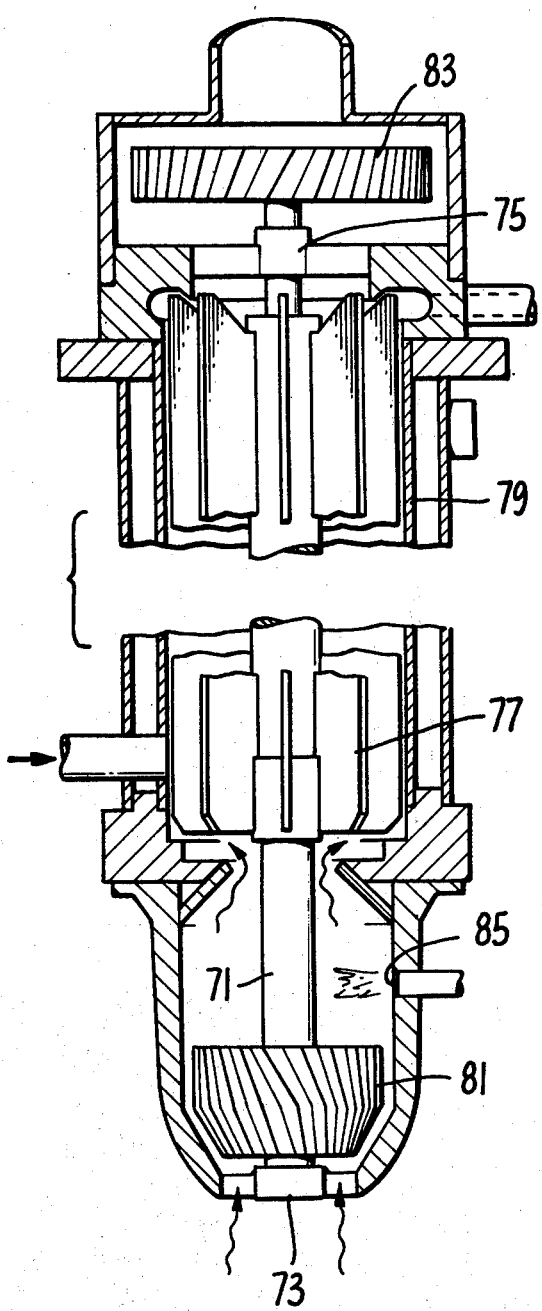
FIG. 3 is a sectional view of an apparatus somewhat similar to FIG. 2 except that the turbine is mounted at the upper end of the rotor shaft.

The embodiment of FIG. 3 is very similar to that of FIG. 2 except that here shaft 71 is mounted for rotation on the bottom bearing 73 and the top bearing 75 and carries the usual blades 77 mounted for rotation within the shell 79. In this instance, the compressor blades 81 are mounted at the bottom of the shaft 71 and the turbine blades 83 are mounted at the top of the shaft. The burner 85 is mounted above the compressor 81. The other parts are as heretofore described and the operation is believed obvious. Air from the compressor 81 is burned in the burner 85 and the exit gas after passing over the blades 77 in the chamber 79, drives the turbine 83.

Figure 4:
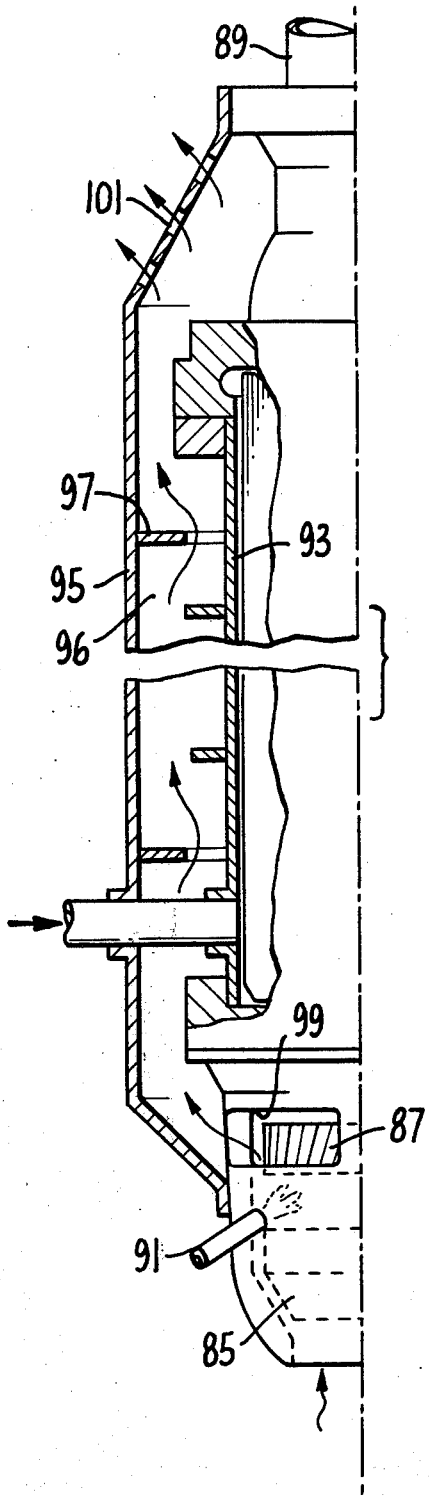
FIG. 4 is a partial sectional view of a device wherein the effluent gas from the turbine is passed through the heat exchanger shell rather than directly through the body of the film climbing apparatus.

In many instances, it is desired to provide internal combustion for driving the shaft and supplying the heat for the evaporative process but it is undesirable to have the hot gas make direct contact with the liquid being treated. Further, in some instances, the passage around the center rotor provides a constriction on the passage of gas and it is desirable that at least some of the gas be diverted from the chamber in which the fluid is being treated. In FIG. 4 there is shown an internal combustion device which provides for the reduction or even elimination of contact between combustion gas and the liquid being treated. The device is substantially the same as is shown in FIG. 2 except for the passage of gas after it leaves the turbine. In this instance, the compressor 85 and turbine 87 are mounted on shaft 89 with the burner 91 located between the compressor and the turbine. The jacket around the cylindrical chamber 93 includes an outer shell 95 with a series of baffles 97 therein forming a chamber 96 for the passage of heat exchange gas. At the outlet of the turbine, passages 99 leading from the turbine to the heat exchanger permit gas to leave the turbine and enter the heat exchanger, while the passages 101 at the top of the heat exchanger serve as a hot gas outlet. With this structure, most of the hot combustion gas does not come into direct contact with the liquid being treated but instead passes through the chamber 96 and serves to heat the fluid climbing wall 93 without being in direct contact with the fluid. In those instances where it is important that none of the combustion gas come into contact with the fluid being treated, shaft 89 can be provided with a rotary seal directly above turbine 87 so that all of the gas can pass through the chamber 96 and not come into contact with the fluid.

Although certain specific embodiments of the invention have been shown, it will be understood that these are for purposes of illustration only and that the invention is not limited to these specific embodiments. Thus, many changes can be made from the exact structure shown without departing from the spirit of this invention.

The turbine and compressor are largely shown in diagrammatic form in that the stators have been omitted and only a single stage is shown.

Although the device has been described primarily as an evaporator, it can be also used for other purposes such as heating without evaporation and dilution by suitably adjusting the feed stocks and heat balance.

We claim:

1. In a thin film climbing heat treating apparatus of the type having an annular chamber with a shaft having a plurality of flat blades extending radially from said shaft, mounted for rotation within said chamber and requiring means to drive said shaft, the improvement comprising a turbine mounted on said shaft and spaced from said flat blades and means for causing a fluid to flow upwardly through the chamber past said flat blades and then through the turbine thereby causing said turbine to rotate said shaft.

2. The structure of claim 1 having in combination:
a. a turbine mounted adjacent to the top of said shaft;
b. means for introducing a liquid near the bottom of said annular chamber;
c. at least one jacket around said annular chamber and
d. means for supplying heat to said jacket from an external source whereby a portion of said liquid is evaporated by heat supplied from said jacekt and the vapor therefrom is utilized to drive said turbine.

3. The structure of claim 1 having an axial compressor mounted near the bottom of said shaft:
a. a turbine spaced from said compressor mounted below the blades on said shaft;
b. means for introducing air below said compressor; and
c. means for introducing a fuel between said compressor and said turbine.

4. The structure of claim 1 having a compressor mounted near the bottom of said shaft and a turbine mounted near the top of said shaft with said blades between said compressor and said turbine;
a. means for introducing air below said compressor; and
b. means for introducing fuel between said compressor and said blades, whereby said fuel burns and the combustion products pass over said blades and into said turbine.

5. A structure in accordance with claim 1 having a vapor jacket surrounding said annular chamber;
a. a compressor mounted near the bottom of said shaft;
b. a turbine mounted below said blades but spaced from said compressor;
c. means for introducing a fuel between said compressor and said turbine; and
d. baffle means for deflecting a portion of the combustion gas from the burning of said fuel whereby a portion of the combustion gas passes over said blades and the balance of said combustion gas passes through said vapor jacket out of contact with said blades.

* * * * *